United States Patent
Dunphy et al.

[15] 3,705,636
[45] Dec. 12, 1972

[54] PRODUCT WEIGHING SYSTEM

[72] Inventors: Kenneth Robert Dunphy, 3322 Belden Drive N.E., Minneapolis, Minn. 55418; Richard Lee Helseth, 6120 5th Avenue S., Minneapolis, Minn. 55419

[22] Filed: Dec. 28, 1970

[21] Appl. No.: 101,466

[52] U.S. Cl. .................177/114, 177/120, 177/122, 177/210
[51] Int. Cl. ........G01g 1/24, G01g 7/00, G01g 13/08
[58] Field of Search..........177/114, 120, 122, 123, 1, 177/210

[56] References Cited

UNITED STATES PATENTS

| | | | |
|---|---|---|---|
| 3,080,936 | 3/1963 | Sher et al. | 177/210 |
| 3,112,805 | 12/1963 | Williams | 177/210 X |
| 3,291,233 | 12/1966 | Mayer | 177/120 X |
| 3,076,516 | 2/1963 | Rouban | 177/122 X |
| 2,352,114 | 6/1944 | Muskat | 177/123 X |
| 2,880,985 | 4/1959 | Roberts | 177/122 X |
| 2,889,131 | 6/1959 | Crabb | 177/120 |
| 3,117,639 | 1/1964 | Dreeben | 177/122 X |
| 3,175,632 | 3/1965 | Rouban | 177/123 X |
| 3,416,619 | 12/1968 | McClusky | 177/123 X |
| 3,540,538 | 11/1970 | Connors et al. | 177/122 |

FOREIGN PATENTS OR APPLICATIONS

| | | | |
|---|---|---|---|
| 1,257,158 | 2/1961 | France | 177/210 |
| 668,202 | 3/1952 | Great Britain | 177/123 |
| 790,079 | 2/1958 | Great Britain | 177/123 |
| 1,093,111 | 11/1967 | Great Britain | 177/121 |

*Primary Examiner*—Robert S. Ward, Jr.
*Attorney*—Orrin M. Haugen

[57] ABSTRACT

A product weighing system having a beam balance which includes a beam having a product receiving station and pivot means forming a support fulcrum for the beam. Position responsive means are coupled to the beam and are adapted to deliver a signal representing the immediate disposition of the beam. The position responsive means includes a transformer having primary and secondary windings, along with movable core means inductively coupling the windings one to another. The core means is operatively coupled to the beam, the arrangement being such that movement of the beam is adapted to vary the inductive coupling between the primary and secondary windings so as to deliver a signal representing the immediate disposition of the beam balance. Means are provided for coupling the signal to a product delivering conveyor, a weighing container, and gates which function in combination with the conveyor and control delivery of product into the weigh container. If desired, the signal may also be coupled to read-out means including visual or audible read-out.

3 Claims, 3 Drawing Figures

PATENTED DEC 12 1972    3,705,636

INVENTORS.
Kenneth Robert Dunphy
Richard Lee Helseth
BY
Orrin M. Haugen
ATTORNEY INVENTORS
Kenneth Robert Dumphy
Richard Lee Helseth
BY
Orrin M. Haugen
ATTORNEY 3,705,636

PRODUCT WEIGHING SYSTEM

BACKGROUND OF THE INVENTION

The present invention relates generally to product weighing systems, and more specifically to such a system employing a beam balance including a fulcrum supported beam with a product receiving station coupled to the beam, along with position responsive means also coupled to the beam. The position responsive means includes a transformer having a primary and secondary winding, along with a movable core inductively coupling the windings, one to another. The core is operatively coupled to the beam balance and provides a signal indicative of the immediate disposition of the beam balance.

In the past, various techniques have been employed to indicate the position of a beam, including a lamp-photocell combinations and the like. These systems, while suitable for a variety of purposes, normally require frequent adjustment and re-adjustment, and also require a clean atmosphere. The electrical characteristics of the photocells are normally such that difficulty may be experienced in accurately weighing product on a dynamic basis, that is, accurately weighing product which is delivered into a weigh container from a conveyor or the like. The present invention obviates these difficulties by utilizing an enclosed transformer having a movable core inductively coupling the primary and secondary windings.

SUMMARY OF THE INVENTION

Briefly, in accordance with the present invention, a product weighing system is provided which utilizes a fulcrum supported beam balance having a product receiving station, and having position responsive means coupled thereto. The position responsive means includes a transformer utilizing a movable core to couple the primary and secondary windings, with the core of the transformer moving along with motion of the beam balance.

Therefore, it is a primary object of the present invention to provide an improved product weighing system which utilizes a beam balance having a fulcrum supported beam, the immediate disposition of the beam being detected by a movable transformer core which inductively couples primary and secondary windings of the transformer.

It is a further object of the present invention to provide an improved product weighing system which is particularly adapted for use in connection with dynamic weigh systems, and which employs a transformer having a movable core inductively coupling the primary and secondary windings, with motion of the beam being reflected in motion of the movable transformer core.

Other and further objects of the present invention will become apparent to those skilled in the art upon a study of the following specification, appended claims, and accompanying drawings.

DESCRIPTION OF THE PREFERRED EMBODIMENT

Figure 1:
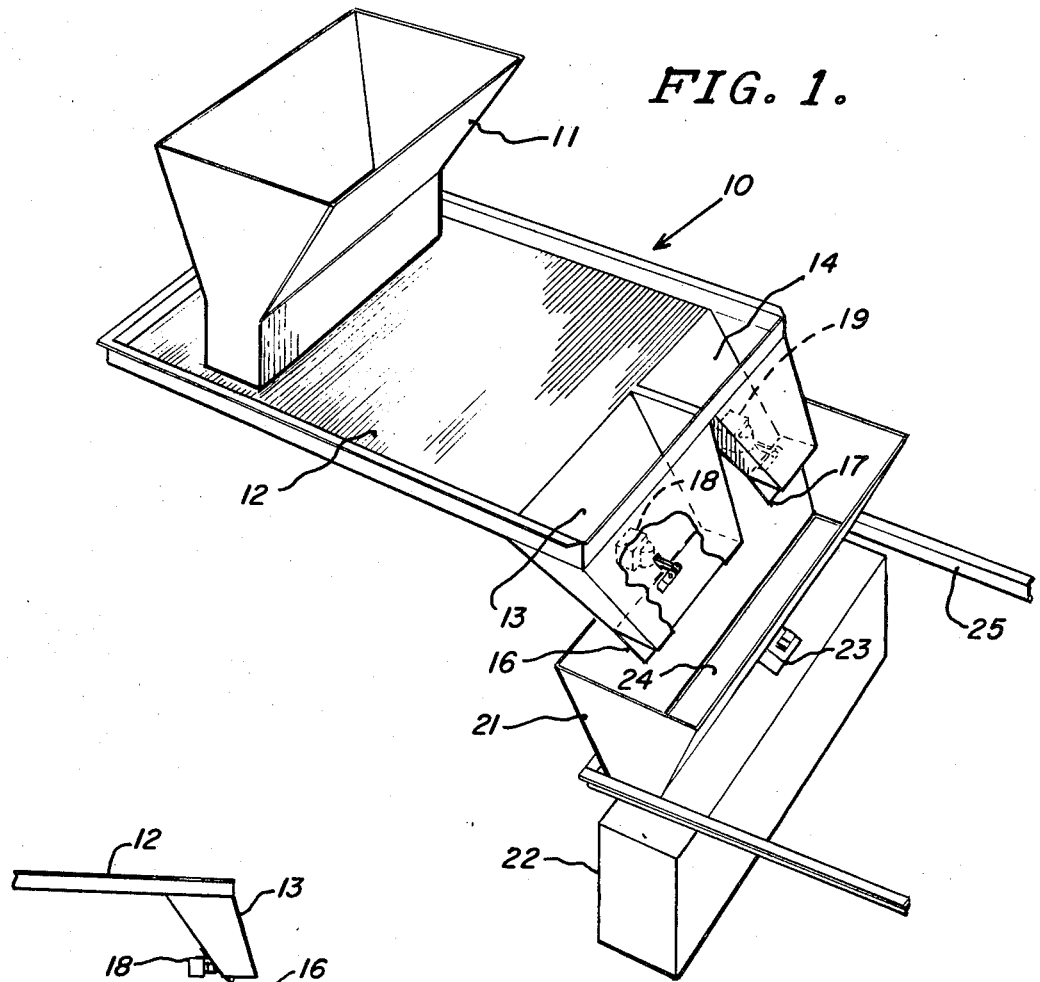
FIG. 1 is an isometric view of a conveyor system utilizing the improved product weighing system of the present invention.

In accordance with the preferred embodiment of the present invention, and with particular reference to FIG. 1, the product weighing system generally designated 10 includes a product supply component such as the hopper 11 which delivers product to the surface of vibratory conveyor 12. Conveyor 12 delivers product to a pair of feed tubes, such as the mass feed 13, and dribble feed 14. The feed units are each provided with solenoid actuated gates, such as the gate 16 in the mass feed, and gate 17 on the dribble feed. Solenoids 18 and 19 are provided for driving gates 16 and 17 respectively.

As is indicated in FIG. 1, both the mass feed 13 and the dribble feed 14 deliver their product into the weigh container 21, with weigh container 21 being adapted to deliver a controlled weight of product into the product pack 22. Weigh container 21 is supported on a beam balance and the weight of the product in container 21 is utilized to control the operation of the system.

Figure 2:
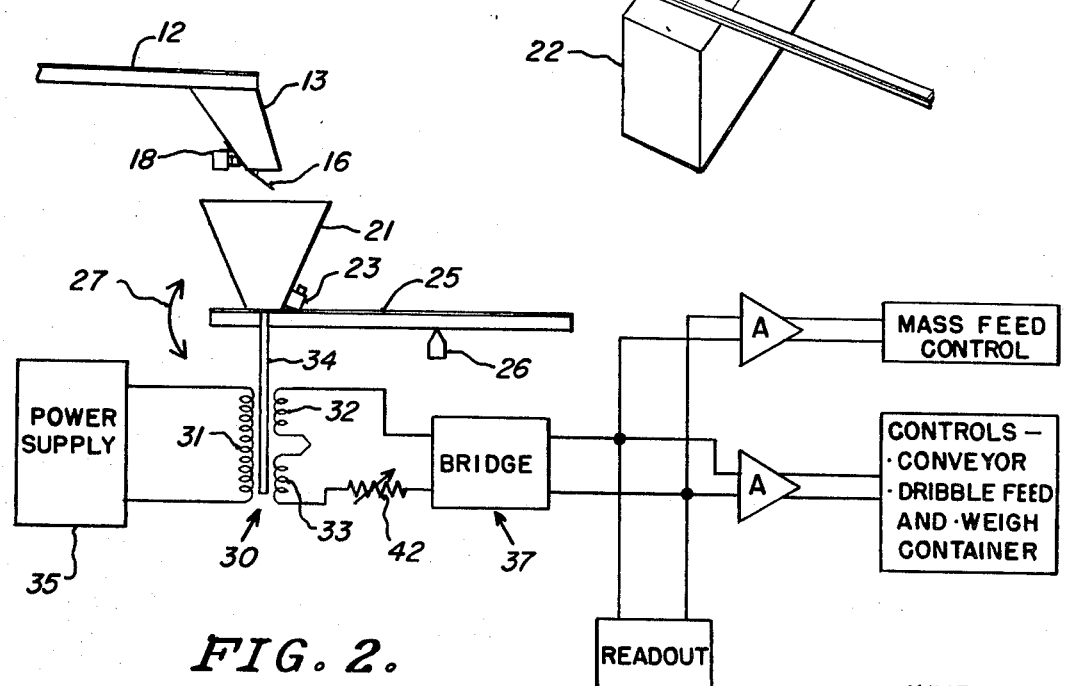
FIG. 2 is a detail plan view of the product weighing system of the present invention.

Attention is now directed to FIG. 2 of the drawings wherein the details of the weigh system are shown. As is indicated, weigh container 21 is supported on the arm of beam 25, with fulcrum 26 being utilized to support the beam 25 and permit pivotal movement of beam 25, as shown in the arrow 27. Also coupled to beam 25 is transformer 30, this transformer being provided with a primary winding 31, a pair of secondary windings 32 and 33, and a movable core 34. Preferably, transformer 30 is a linear variable differential transformer, such devices being provided with one primary and two secondary windings, with one secondary being disposed at each end of the primary. The secondary windings are normally connected in series opposed relationship, one to another. In this type of device, when the linear position of the core changes, the magnetic coupling produces a signal proportional to the distance the core is moved. For proper operation of the device, the primary winding 31 is preferably coupled to a constant voltage power supply, such as the power supply 35, and delivers power to the primary of transformer generally designated 36.

The output of the transformer 30 is directed to bridge generally designated 37, and the output of bridge 37 is taken to the appropriate amplifiers for actuation of control devices, such as relays and solenoids. The arrangement is illustrated in block diagram form in FIG. 2.

Figure 3:
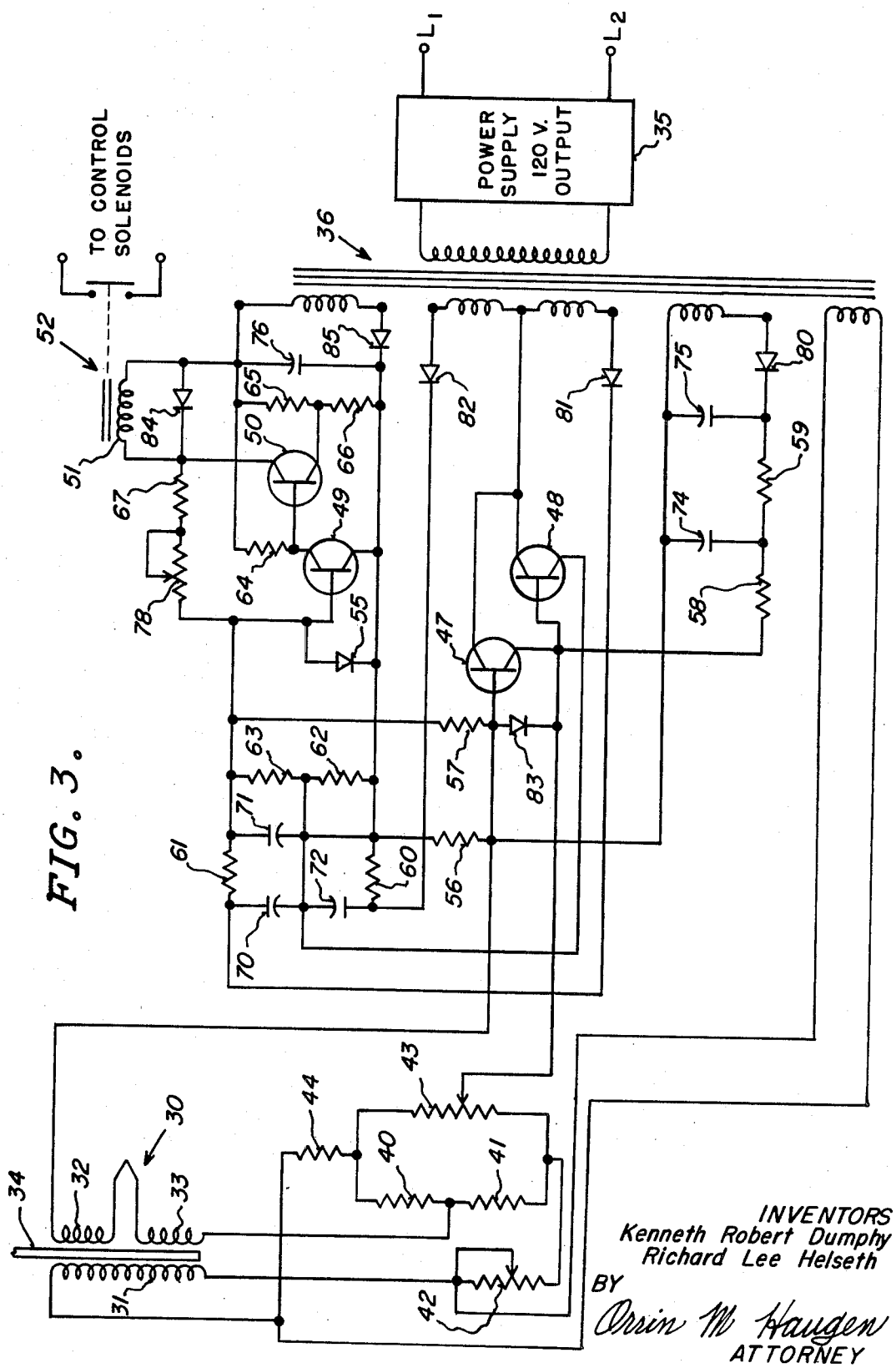
FIG. 3 is a schematic diagram of a typical circuit used in the product weighing system of the present invention.

Attention is now directed to FIG. 3 of the drawings wherein a schematic diagram of a typical operational amplifier and bridge circuit is shown. In the circuit arrangement as shown, the primary 31 of transformer 30 is coupled to a source of constant voltage, with the output of the transformer being amplified so as to operate control relays and/or solenoids. A bridge arrangement is provided to permit appropriate adjustment and calibration of the system, the bridge including fixed resistors 40 and 41, together with a potentiometer 42, potentiometer 42 being utilized to perform calibration of the system. A second potentiometer 43 is utilized as a span calibration potentiometer. Resistor 44 is utilized to couple the other side of the input to the bridge.

With continued attention being directed to FIG. 3 of the drawings, the output of the bridge arrangement is amplified in the amplifier system shown. This output is directed to the transistors 47 and 48. The state of conduction of transistors 47 and 48 will be utilized to control and amplify the conductive state of transistors 49 and 50, with the conductive state of transistor 50 being utilized to actuate the coil 51 of relay generally designated 52. The output of relay 52 is accordingly utilized to control the flow of current to solenoids such as the solenoids 18 and 19 which control the feeds, as well as solenoid 23 which controls the opening and closing of gate 24 on weigh container 21.

The remaining components in the circuit diagram of FIG. 3 are provided for conventional amplification purposes, and the characteristics and values of each component will be set forth in Table I hereinbelow.

In a typical operation of the system, product supply is delivered from the hopper 11 onto the vibrator conveyor 12 and transferred to the mass feed and dribble feed 13 and 14. The solenoids 18 and 19 are de-energized, and gates 16 and 17 are maintained in open disposition to permit the flow of product through the feeds into the weigh container 21. As the weight of product within weigh container 21 approaches the desired level, the signal from a first transformer device such as the device 30 is utilized to close gate 16, and thus limit the flow of incoming product to the dribble feed segment only. In normal operation, the mass feed and dribble feed systems are on a ratio of approximately 3:1, as is conventional in the art. Product continues to advance along conveyor 12, and is discharged into weigh container 21 solely through dribble feed 14. Upon achieving the desired weight of product in weigh container 21, solenoid 19 is actuated to close gate 17, and also temporarily interrupt the driving of conveyor 12. At this time, or after a predetermined delay period, to permit product stabilization, solenoid 23 is actuated to open gate 24, and thus deliver the charge of weighed product into the pack or container 22. After the dumping is complete, the system is re-set for another cycle, with gate 24 being closed, and 16 and 17 being opened.

In certain product dispensing or weighing systems, it may be appropriate to provide a gate means or the like to interrupt flow of product into the mass feed portion of the system while product is continuing its flow into the dribble feed. In such an arrangement, a gate, barrier, or the like would be interposed between the end of the conveyor 12 and the opening to the mass feed, so as to accommodate flow solely into the dribble feed portion 14.

In operations where rapid cycling of the system is desired, diode 55 is employed so as to permit rapid discharge of any accumulated charge on capacitors provided in the system.

As has been indicated, the product weighing system may incorporate more than one transformer device having a movable core to control the coupling of the windings. Thus, in a typical system, one such device can be utilized to provide a signal for controlling one set of conditions or devices, while others may be utilized for additional control. Typically, in a product weighing system, one such device is used to control the mass feed, while the other is used to control dribble feed, conveyor, and weigh container.

In certain systems, it may be desirable to provide for read-out, either visual or audio. Thus, the output of the movable core transformer devices may be utilized to provide signals to an amplifier for driving a digital read-out device, a print-out or punch device, or a computer or calculator for a variety of purposes. As has been indicated, the transformer device having a movable core coupling the primary and secondary windings provides a rugged system which is substantially insensitive to adverse environmental condition. As such, the unit may be utilized to control the weighing of food products, or other items which require precise control in the quantities dispensed. Because of Governmental regulations involving the sale of commodities, for example, the packager must meet specified minimum quantities, and accuracies, in order to maintain his business reputation, and also to avoid dispensing overweight packages which are reflected or are analogous to a loss of the product.

While the system has been described as one being utilized in the fill-station, it will be appreciated that the system is also adaptable for use with bulk fillers, loaders, or the like. In addition, it has been indicated that the various functions of the system may be operated from separate transformer devices. It will also be understood and appreciated that a single such device may be utilized with an appropriately calibrated amplifier for performing the various functions required. If desired, a single transformer utilizing a movable core may be provided for delivering input signals to several amplifier devices. In each instance, each amplifier is calibrated so as to perform its function upon sensing an input signal of predetermined magnitude.

In order to better comprehend the system, the following circuit components are recommended:

TABLE I

| Components | Values |
| --- | --- |
| Resistors 40, 41, 44 | 220 ohms |
| Resistors 56 and 57 | 12 K |
| Resistor 58 | 27 K |
| Resistor 59 | 6200 |
| Resistors 60 and 61 | 4700 |
| Resistors 62 and 63 | 5.1 K |
| Resistor 64 | 6200 ohms |
| Resistor 65 | 5600 ohms |
| Resistor 66 | 60 |
| Resistor 67 | 68 K |
| Capacitors 70 – 75 | 20 ufd |
| Capacitor 76 | 100 ufd |
| Potentiometer 42 | 5 K |
| Potentiometer 43 | 500 ohm |
| Potentiometer 78 | 300 K |
| Diode 55 | 1N645 |
| Diodes 80 - 84 | 1N645 |
| Diode 85 | SD-92 |
| Transistors 47, 48 and 49 | 2N217 |
| Transistor 50 | 2N591 |

It will be appreciated, of course, that these circuit values are typical for one operational mechanism or scheme, and that variations may be made as the requirements of the immediate situation.

We claim:

1. In a product weighing system:
   a. a single product delivering conveyor and beam balance means including a beam having a product receiving station adapted to receive product from said conveyor, and pivot means forming a support fulcrum for said beam;

b. position responsive means coupled to said beam and adapted to deliver a signal representing the immediate disposition thereof, said position responsive means including a transformer having a primary winding, a secondary winding, and movable core means inductively coupling said windings, one to another, said core means being operatively coupled to said beam with the movement of said beam being adapted to vary the inductive coupling between said primary and secondary windings;

c. power supply means coupled to said primary winding and adapted to deliver electrical power to said primary winding at a substantially constant potential;

d. said product receiving station being a weigh container disposed along said product delivering conveyor, said container having side walls, an open top and a bottom closure wall adapted to intermittently open in response to a signal from said transformer indicating said beam balance means having reached a certain limited predetermined position indicating a fill of product having been received; 1 e. said conveyor means having first and second delivery channels with said first delivery channel receiving product at a substantially greater rate from said conveyor than said second delivery channel, each delivery channel being disposed immediately adjacent said weigh container and being arranged to deposit product into said weigh container with each delivery channel having reciprocatorily movable gate means for controllably interrupting flow of product into said weigh container, the gate means for said first delivery channel being closed in response to a first signal generated by said transformer indicating said beam balance means having reached a certain first predetermined position which is prior to reaching said limited predetermined position, the gate means for said second delivery channel remaining open and continuing to deliver product to said weigh container until being closed in response to a second signal generated by said transformer indicating said beam balance means having reached said limited predetermined position; and f. means interrupting said product delivering conveyor in response to said second signal.

2. The product weighing system as defined in claim 1 being particularly characterized in that read-out means are provided, with said transformer being coupled to said read-out means.

3. The product weighing system as defined in claim 1 being particularly characterized in that the secondary windings of said transformer are coupled to amplifier means, with the magnitude of signals from said secondary winding being controllably adjustable.

* * * * *